| (12) | United States Patent<br>Uselton et al. | (10) Patent No.: US 12,092,610 B2<br>(45) Date of Patent: Sep. 17, 2024 |
|---|---|---|

(54) APPARATUS, SYSTEMS, AND METHODS FOR INSPECTING TUBULARS EMPLOYING FLEXIBLE INSPECTION SHOES

(71) Applicant: SCAN SYSTEMS, CORP, The Woodlands, TX (US)

(72) Inventors: Danny Uselton, Spring, TX (US); John Tolman, Humble, TX (US); John Zeigler, The Woodlands, TX (US)

(73) Assignee: SCAN SYSTEMS, CORP, The Woodlands, TX (US)

( * ) Notice: Subject to any disclaimer, the term of this patent is extended or adjusted under 35 U.S.C. 154(b) by 0 days.

(21) Appl. No.: 17/869,146

(22) Filed: Jul. 20, 2022

(65) Prior Publication Data

US 2023/0017106 A1 Jan. 19, 2023

Related U.S. Application Data

(63) Continuation of application No. 16/987,221, filed on Aug. 6, 2020, now Pat. No. 11,402,352.

(60) Provisional application No. 62/889,372, filed on Aug. 20, 2019.

(51) Int. Cl.
*G01N 27/9093* (2021.01)
*G01N 27/90* (2021.01)

(52) U.S. Cl.
CPC ..... *G01N 27/9093* (2013.01); *G01N 27/9006* (2013.01)

(58) Field of Classification Search
CPC ........ G01N 27/82; G01N 27/83; G01N 27/85; G01N 27/87; G01N 27/90–9093
USPC ....................................................... 324/227
See application file for complete search history.

(56) References Cited

U.S. PATENT DOCUMENTS

| 2,563,254 | A | 8/1951 | Lewis |
| 3,437,917 | A | 4/1969 | Gunkel et al. |
| 3,539,915 | A | 11/1970 | Walters et al. |
| 3,710,236 | A | 1/1973 | Halsey et al. |

(Continued)

FOREIGN PATENT DOCUMENTS

| DE | 3729743 A1 | 3/1989 |
| JP | S61277051 A | 12/1986 |

(Continued)

OTHER PUBLICATIONS

AN9003—A User's Guide to Intrinsic Safety, retrieved from the Internet Jul. 12, 2017.

(Continued)

*Primary Examiner* — Eman A Alkafawi
*Assistant Examiner* — Rahul Maini
(74) *Attorney, Agent, or Firm* — Jeffrey L. Wendt; THE WENDT FIRM, P.C.

(57) ABSTRACT

High-speed tubular inspection systems include a frame at least one magnetic flux generator contained in a coil annulus and a detector assembly each having inlet and outlet openings for passing a tubular member there through. The detector assembly has one or more magnetic detectors and one or more eddy current detectors configured to be spaced a first distance from the tubular member during an inspection. The detectors are each contained in one or more EMI detector shoes. A conveyor supports the frame and a drive mechanism configured to drive the tubular member through the coil annulus (or drive the coil annulus past the tubular member) at high-speeds.

20 Claims, 5 Drawing Sheets

(56) References Cited

U.S. PATENT DOCUMENTS

| | | | |
|---|---|---|---|
| 3,958,049 A | 5/1976 | Payne | |
| 4,058,762 A | 11/1977 | Holt et al. | |
| 4,217,548 A | 8/1980 | Furukawa et al. | |
| 4,218,651 A | 8/1980 | Ivy | |
| 4,378,072 A | 3/1983 | Appleman | |
| 4,465,829 A | 8/1984 | Graves | |
| 4,503,393 A | 3/1985 | Moyer et al. | |
| 4,510,447 A * | 4/1985 | Moyer | G01N 27/902 324/225 |
| 4,534,405 A | 8/1985 | Hulek | |
| 4,585,826 A | 4/1986 | Graves | |
| 4,602,212 A * | 7/1986 | Hiroshima | G01N 27/9046 324/227 |
| 4,629,991 A | 12/1986 | Wheeler | |
| 4,675,604 A | 6/1987 | Moyer | |
| 4,739,273 A | 4/1988 | Peterson et al. | |
| 4,912,410 A | 3/1990 | Morley | |
| 4,916,394 A | 4/1990 | Thompson | |
| 5,007,291 A | 4/1991 | Walters et al. | |
| 5,030,911 A | 7/1991 | Lam | |
| 5,142,230 A | 8/1992 | Nottingham | |
| 5,157,977 A | 10/1992 | Grubbs | |
| 5,446,382 A | 8/1995 | Flora | |
| 5,671,155 A | 9/1997 | Edens et al. | |
| 5,914,596 A | 6/1999 | Weinbaum | |
| 5,943,632 A | 8/1999 | Edens et al. | |
| 6,316,937 B1 | 11/2001 | Edens | |
| 6,580,268 B2 | 6/2003 | Wolodko | |
| 6,745,136 B2 | 6/2004 | Lam et al. | |
| 6,912,097 B2 | 6/2005 | Woods | |
| 6,924,640 B2 | 8/2005 | Fickert et al. | |
| 7,038,445 B2 | 5/2006 | Walters et al. | |
| 7,107,154 B2 | 9/2006 | Ward | |
| 7,337,673 B2 | 3/2008 | Kennedy et al. | |
| 7,346,455 B2 | 3/2008 | Ward et al. | |
| 7,397,238 B2 | 7/2008 | Walters et al. | |
| 7,560,920 B1 | 7/2009 | Ouyang et al. | |
| 7,622,917 B2 | 11/2009 | Walters et al. | |
| 7,640,811 B2 | 1/2010 | Kennedy et al. | |
| 7,795,864 B2 | 9/2010 | Barolak et al. | |
| 8,020,460 B1 | 9/2011 | Hoyt | |
| 9,097,081 B2 | 8/2015 | Biddick | |
| 9,646,599 B2 * | 5/2017 | Gayle | G01N 29/28 |
| 9,879,131 B2 | 1/2018 | Bedard et al. | |
| 10,082,485 B2 | 9/2018 | Uhlig et al. | |
| 10,767,470 B2 | 9/2020 | Fouda et al. | |
| 11,307,173 B1 | 4/2022 | Uselton et al. | |
| 11,402,351 B1 | 8/2022 | Uselton et al. | |
| 11,402,352 B1 | 8/2022 | Uselton et al. | |
| 2007/0024278 A1 | 2/2007 | Walters et al. | |
| 2018/0196005 A1 | 7/2018 | Fanini et al. | |
| 2020/0040674 A1 | 2/2020 | McKenzie | |
| 2020/0049662 A1 * | 2/2020 | Shumka | G01N 27/904 |
| 2022/0196611 A1 * | 6/2022 | Ramle | G01N 29/28 |

FOREIGN PATENT DOCUMENTS

| | | |
|---|---|---|
| JP | S63221239 A | 9/1988 |
| JP | S6447944 A | 2/1989 |
| JP | H01110251 | 4/1989 |
| JP | H01232254 A | 9/1989 |
| JP | H02253152 A | 10/1990 |
| JP | H06148139 A | 5/1994 |
| JP | 2000081419 A | 3/2000 |
| JP | 2014044087 A | 3/2014 |

OTHER PUBLICATIONS

Buckley, J.M., "An introduction to Eddy Current Testing theory and technology", pp. 1-7, Dec. 29, 1998, place of publication unknown, retrieved from the Internet Jun. 13, 2019.

Walters et al., "Using Magnetic Flux Density to Identify Anomalies in Pipe Wall Thickness", pp. 1-21, Dec. 23, 2005, place of publication unknown, retrieved from the Internet Nov. 19, 2012.

Staff report, Hydraulics & Pneumatics, "Fundamentals of quick-acting couplings", pp. 1-12, Jan. 1, 2012, place of publication unknown, retrieved from the Internet May 14, 2019.

HARCO Metal Products Inc., "Telescoping Tube", 1 page, 2013, place of publication unknown, retrieved from the Internet May 13, 2019.

Stanley, R. K., "Electromagnetic Inspection of Carbon Steel Tubes", pp. 1-10, 1998, ASME NDE Group Conference, San Antonio, TX, published by NDE Information Consultants, Houston, Texas.

Jain, N., "The Rebirth of Eddy Current Nondestructive Testing", Quality Magazine, pp. 1-5, Aug. 11, 2014.

Niese et al., "Wall Thickness Measurement Sensor for Pipeline Inspection using EMAT Technology in Combination with Pulsed Eddy Current and MFL", ECNDT 2006—Tu.3.1.5, pp. 1-10, published by ECNDT (2006).

Yang, et al., "Inspection and Identification of Inner-Outer Defects on Oil-gas Pipeline", 17th World of. on Nondestructive Testing, Oct. 25-28, 2008, Shanghai, China, Chinese Society for Nondestructive Testing, Shanghai, China, downloaded from the Internet May 4, 2022, url: https://www.ndt.net/search/docs.php3?id=6673&file=article/wcndt2008/papers/487.pdf.

* cited by examiner

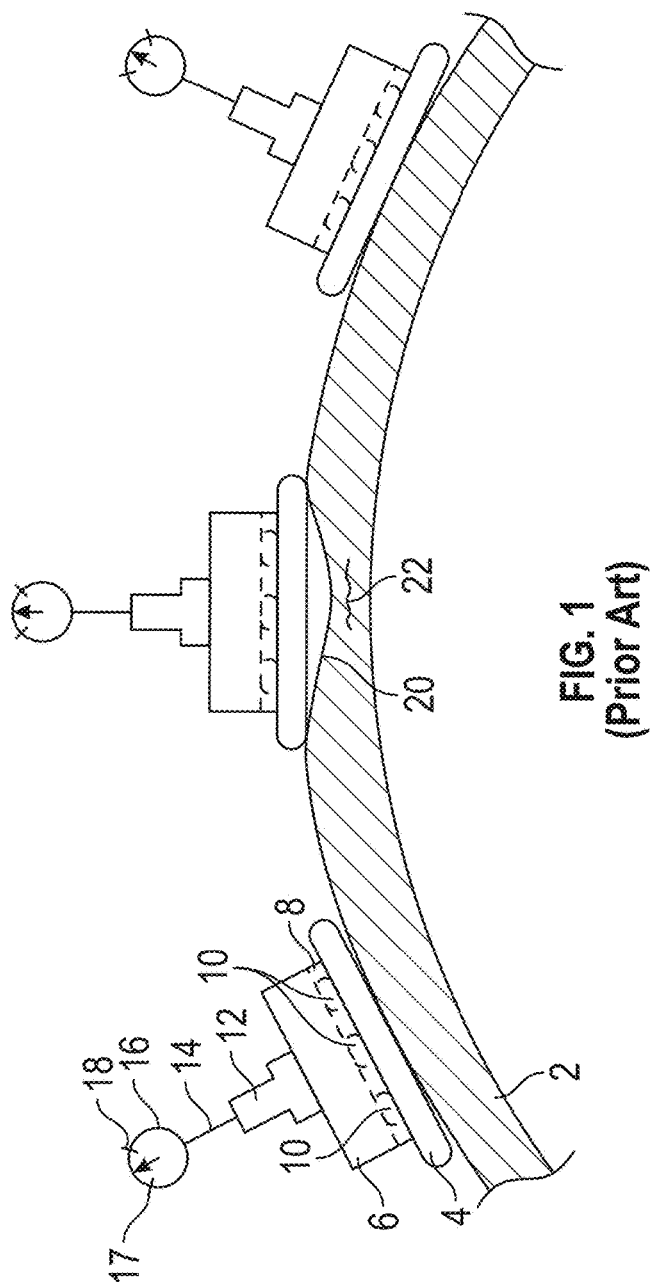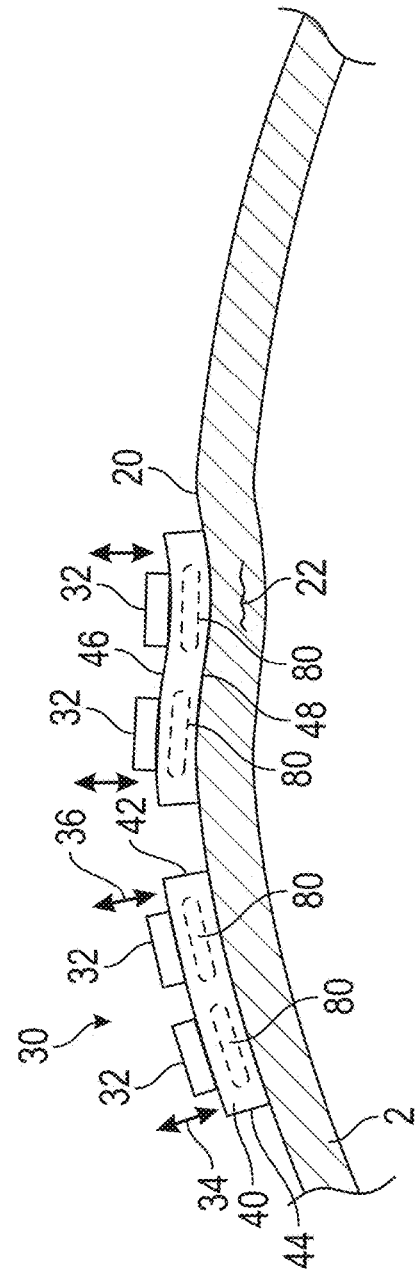

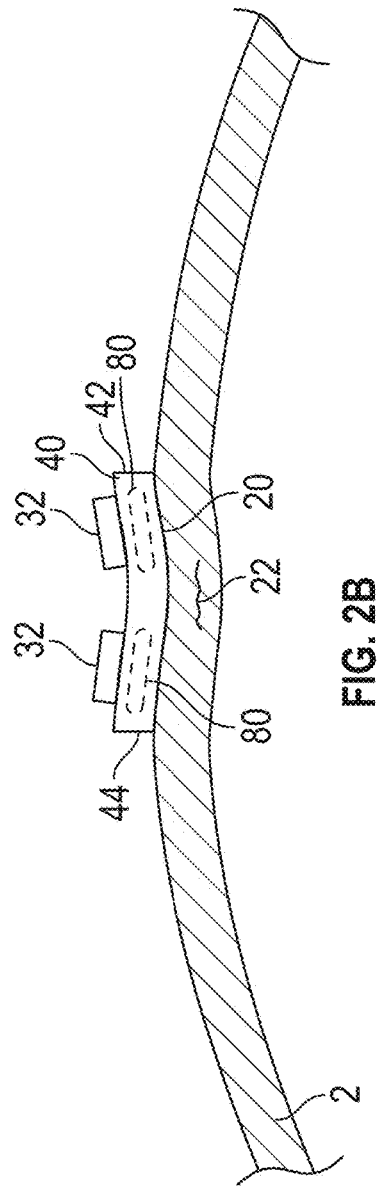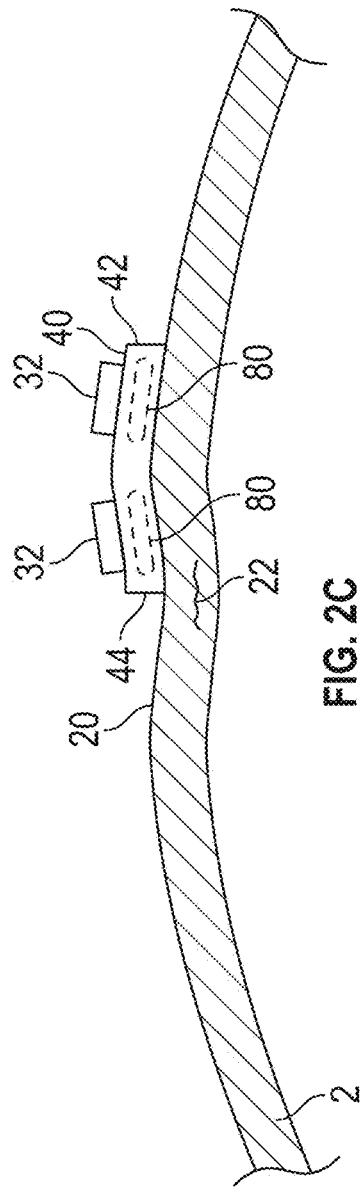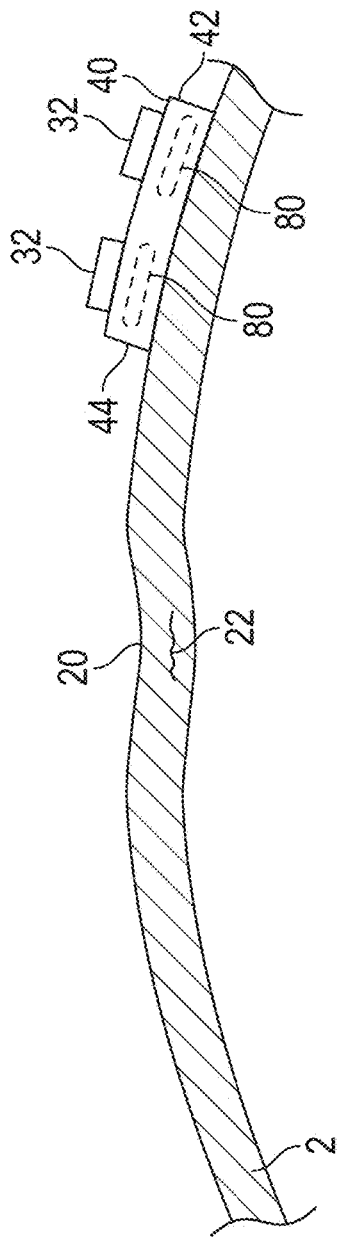

150 ⬉

152
A method of EMI inspecting tubular members comprising passing a tubular member through an EMI apparatus, or driving the EMI apparatus past the tubular member, and detecting variations in the magneting field produced by defects in the tubular member, wherein the EMI inspection apparatus comprises:

154
(a) a frame (102);
(b) at least one magnetic flux generator (104) contained in a coil annulus (108) and a detector assembly (106) supported by the coil annulus (108);
(c) the coil annulus (108) and the detector assembly (106) each having inlet and oulet openings (110,112) for passing a tubular member (2) there through, the detector assembly (106) having one or more magnetic detectors (80) (magnetic flux, eddy current, or both) configured to be spaced a first distance from the tubular member (2) during an inspection (box 154); and

156
(d) the one or more magnetic detectors (80) each contained in one or more EMI detector shoes (30), at least one of the one or more EMI detector shoes comprising:
(i) a flexible, generally planar body (40) comprising a flexible material, the flexible, generally planar body (40) having a leading end (42), a trailing end (44), a non-working major face (46), and a working major face (48) the leading end (42), trailing end (44), non-working major face (46), and working major face (48) at least partially defining an inspection zone (50) therebetween;
(ii) one or more magnetic flux detectors (80) carried by flexible, generally planar body (40) in the inspection zone (50); and
(iii) one or more pressure actuators (52) removably attached to the non-working face (46) and configured to exert pressure on one or more regions (90) of the non-working major face (46) of the flexible, generally planar body (40) in the inspection zone (50) during an EMI inspection of a tubular (2), forcing the flexible, generally planar body (40) to contort into a non-generally planar shape as it passes over a contoured region (20) of the tubular (2).

FIG. 6

APPARATUS, SYSTEMS, AND METHODS FOR INSPECTING TUBULARS EMPLOYING FLEXIBLE INSPECTION SHOES

CROSS-REFERENCE TO RELATED APPLICATIONS

This application is entitled to and claims the benefit of earlier filed provisional application No. 62/889,372, filed Aug. 20, 2019, under 35 U.S.C. § 119(e), and nonprovisional application Ser. No. 16/987,221, filed Aug. 6, 2020 (now U.S. Pat. No. 11,402,352, issued Aug. 2, 2022) which earlier filed provisional and nonprovisional applications are incorporated by reference herein in their entirety.

BACKGROUND INFORMATION

Technical Field

The present disclosure relates to apparatus, systems, and methods useful for testing the quality of tubular goods (hollow or solid), particularly automated inspection of tubular goods (sometimes referred to in the oil & gas industry as "oil country tubular goods", and herein sometimes as simply "OCTG").

Background Art

As noted in assignee's previous U.S. Pat. Nos. 7,397,238 and 7,622,917, electromagnetic inspection (EMI) of metal pipe or solid metal tubular members by magnetic means conventionally involves magnetizing the member to create a magnetic field which extends circumferentially and is characterized by lines of magnetic flux which extend either axially of the tubular member or generally perpendicular to its axis, dependent on the manner by which magnetism is induced. In many of the present systems, current flow through a wire coil positioned about the tubular member forms magnetic lines of flux through the opening of the coil which extend axially of the member under inspection. In other systems, current flows axially of the tubular member within the wall thereof so as to create a magnetic field, the lines of flux of which extend circumferentially about the tubular member in an orientation substantially perpendicular to the tubular member. The presence of structural flaws or anomalies in the wall of the tubular member, such as surface nicks or pits, cracks, voids, or various crystalline discontinuities, disturbs the uniformity of a magnetic field in the wall of the tubular member. Accordingly, the structural integrity of the tubular member and its relative freedom of such flaws may be inspected by sensing and detecting the magnetic field variations with sensors disposed closely adjacent the surface of the tubular member.

The sensing of variations in a magnetic field in a pipe wall is customarily achieved by passing or moving an induction coil or similar device through the magnetic field and any magnetic field variations to induce voltages in the coil indicative of the magnetic field variations. The voltages or voltage signals may then be transmitted to appropriate recording and processing equipment. For optimum detection sensitivity and for detection of very small cracks in a pipe wall which can be a few thousandths of an inch in depth, and as explained in U.S. Pat. No. 4,916,394, it is necessary that the detecting or sensor coil be placed closely adjacent the exterior surface of the tubular member. Normally the adjacent coil is disposed from 0.002 inches (0.051 mm) to 0.020 inches (0.51 mm) relative to the surface of the tubular member with an axis of the coil substantially perpendicular to the surface. In the sensor shoes described in the '394 patent, one or more sensor coils are mounted in a recess in a non-magnetic support, such as brass, using a potting material such as epoxy. The brass support is provided with a thin magnetically transparent shim (such as stainless steel) covering the sensor coils, and a pair of wear-resistant contact members are attached to the shim, made for example of tungsten carbide or beryllium-copper alloy, adapted to contact with the surface of the tubular member in a manner so that the sensing coils are supported closely adjacent the surface of the tubular member at an optimum distance or spacing. The coils are protected from direct contact with the surface of the pipe by means of the thin shim of stainless steel. It is also known to use hard, non-flexible plastic shoe supports.

Inspecting the surface of the tubular members requires that the inspection sensor be moved along the surface in a predetermined inspection path. In one widely used pipe inspection apparatus, a plurality of sensor shoes are applied to the surface of the pipe in circumferential spacing thereabout and each of the sensor shoes is moved relatively to the pipe in a circumferential helical path whereby the plurality of sensors provides more than 100 percent coverage of the pipe surface. The relative movement may be affected by moving the sensors longitudinally while rotating the sensor shoes around a stationary pipe or the pipe can be moved longitudinally while the sensors are rotated about the pipe. In any event, there is relative sliding movement between the sensor shoes and the pipe surface, which causes wear of the contact surfaces of a sensor shoe by extensive use. The shim also can come into contact with the pipe and can be similarly eroded. The wearing down of the contact surfaces and shim results in the coils being supported from the pipe surface inside the optimum spacing range or possibly being damaged by eventual contact with the pipe. When either event occurs, either a new sensor shoe is required, or adjustments to the contact surfaces and/or shim as explained in the '394 patent must be made.

Furthermore, sensor shoes are customarily designed for use with a specific diameter of pipe, and the contact surfaces of a sensor shoe are fixed in a permanent orientation such that when placed in contact with the surface of the pipe, the sensing coil is positioned for optimum detection sensitivity. Accordingly, a given sensor shoe is designed for inspection of only one diameter of pipe and is inappropriate for use as an inspection sensor for pipes of a different diameter since for such pipe diameters the sensing coil is supported at other than an optimum distance from the surface to be inspected. The '394 patent addresses this problem using a pair of adjustable, wear-resistant elongate contact members having triangular cross-section, whereby adjustment screws in slots are employed for adjustment of each; however, the adjustment of these contact members may be physically challenging, and the adjustment (alignment) must be identical for both. U.S. Pat. No. 4,602,212 describes sensors holders (housing therein magnetic field detectors) that are mounted radially movably through a link mechanism providing a leaf spring to push the sensor holders radially inwardly. However, these leaf springs simply provide an action urging the entire sensor structure against the member being inspected; there is no provision for accommodating inspection of out-of-round tubulars with the same arrangement of sensors. U.S. Pat. No. 8,020,460 describes a similar arrangement, whereby a flexible sensor mount may comprise an elastic material, such as a polyurethane elastomer, thereby permitting relative motion of a relatively rigid sensor housing that houses one or more sensors. Non-flexible, rigid, sensor shoes are less sensitive to out-of-round tubulars, or tubulars having shallow external concave deformities. If there is a defect in the tubular, such as a crack, under or within the concavity, sensors within these non-flexible, rigid shoes may miss the defect entirely, producing "cut-outs" in the electronic inspection signals received from such sensors. U.S. Pat. No. 7,640,811 describes a mechanical probe extension coupler that presses an acoustic inspection probe (described in U.S. Pat. No. 7,337,673) against the structure to adjust for surface contour changes. By sensing pressure increase or decrease outside of a preferred range due to the contour changes, the probe extension adjusts the pressure exerted on the probe, maintaining a consistent standoff distance for one or more acoustic transducers. However, if the surface contour change is a concavity smaller than the probe sleds, this technique will not succeed in finding a defect in the tubular, such as a crack, under or within the concavity.

One goal of OCTG producers is high tonnage production per day or other time period, and any process or sub-process that slows down the manufacturing of OCTG or other tubulars is disadvantageous economically. In short, the more tons of pipe out the door the better. From the above it is evident that there is a need in the art for improvements in tubular member inspection methods and apparatus, particularly for those that can inspect out-of-round tubulars or tubulars having shallow external concave deformities, without great loss of time in changing or adjusting the sensors shoes to accommodate these tubulars, and with less signal cut-outs. The apparatus, systems, and methods of the present disclosure are directed to these needs.

SUMMARY

In accordance with the present disclosure, apparatus and systems for inspecting OCTG and other tubulars are presented, and methods of using same to inspect OCTG and other tubulars are described which reduce or overcome many of the faults of previously known apparatus, systems, and methods.

A first aspect of the disclosure is an EMI shoe (30) comprising:
  (a) a flexible, generally arcuate body (40) comprising a flexible material, the flexible, generally arcuate body (40) having a leading end (42), a trailing end (44), a non-working major face (46), and a working major face (48), the leading end (42), trailing end (44), non-working major face (46), and working major face (48) at least partially defining an inspection zone (50) therebetween;
  (b) one or more magnetic flux detectors (80) carried by the flexible, generally arcuate body (40) in the inspection zone (50); and
  (c) one or more pressure actuators (52) removably attached to the non-working face (46) and configured to exert pressure on one or more regions (90) of the non-working major face (46) of the flexible, generally arcuate body (40) in the inspection zone (50) during an electromagnetic inspection of a tubular (2), forcing the flexible, generally arcuate body (40) to contort into a generally contoured shape as it passes over a contoured region (20) of the tubular (2).

In certain embodiments the flexible material may have a 300% modulus less than or equal to about 2100 psi (about 14 MPa), or ranging from about 2000 psi (about 14 MPa) to about 1000 psi (about 7 MPa), when tested in accordance with ASTM D412-2015 (Method A); or a 100% modulus less than or equal to about 1000 psi (about 7 MPa), or ranging from about 25 psi (about 0.2 MPa) to about 1000 psi (about 7 MPa), when tested in accordance with ASTM D412-2015 (Method A); or a compression set (CB or $C_B$) less than or equal to about 50, or less than or equal to about 25, less than or equal to about 10, or less than or equal to about 5, or about 1, or about 0, when tested in accordance with ASTM D395-2018 (Method B). In certain embodiments the flexible material may have a 300% modulus less than or equal to about 2100 psi (about 14 MPa), or ranging from about 2000 psi (about 14 MPa) to about 1000 psi (about 7 MPa); and a 100% modulus less than or equal to about 1000 psi (about 7 MPa), or ranging from about 25 psi (about 0.2 MPa) to about 1000 psi (about 7 MPa); and a compression set (CB or $C_B$) less than or equal to about 50, or less than or equal to about 25, less than or equal to about 10, or less than or equal to about 5, or about 1, or about 0. In certain embodiments the flexible material may have an abrasion resistance ranging from about 0 to about 200 $mm^3$, or from about 20 to about 150 $mm^3$, or from about 60 to about 135 $mm^3$, when tested in accordance with ASTM D5963-04(2015).

In certain embodiments the one or more pressure actuators (52) may comprise one or more springs, in certain embodiments having a spring force able to force the flexible material into a concave contour, where the concave contour has a maximum depth of about 0.1 inch (about 2.5 mm), or about 0.2 inch (about 5 mm), or about 0.3 inch (about 7.5 mm), or about 0.4 inch (about 10 mm), or about 0.5 inch (12.5 mm). In certain embodiments the one or more pressure actuators (52) may comprise a differential pressure actuator. In certain embodiments the differential pressure actuator may comprise a closed conduit arranged in a curvilinear structure.

In certain embodiments the EMI shoes may further comprising one or more pressure plates (70) interposed between the one or more pressure actuators and the non-working face of the flexible, generally arcuate body (40). In certain embodiments the one or more pressure plates (70) may have a flexural strength greater than the flexible material of the flexible, generally arcuate body (40); in certain embodiments the flexural strength may be about 40 MPa or higher, or from about 40 MPa to about 270 MPa, or from about 70 MPa to about 200 MPa (when tested in accordance with ASTM D-790-2017).

A second aspect of the disclosure is a tubular member EMI apparatus comprising:
  (a) a frame (102);
  (b) at least one magnetic flux generator (104) contained in a coil annulus (108) and a detector assembly (106) supported by the coil annulus (108);
  (c) the coil annulus (108) and the detector assembly (106) each having inlet and outlet openings (110, 112) for passing a tubular member (2) there through, the detector assembly (106) having one or more magnetic detectors (80) (magnetic, eddy current, or both) configured to be spaced a first distance from the tubular member (2) during an inspection; and
  (d) the one or more magnetic detectors (80) each contained in one or more EMI detector shoes (30), the one or more EMI detector shoes (30) comprising:
    (i) a flexible, generally arcuate body (40) comprising a flexible material, the flexible, generally arcuate body (40) having a leading end (42), a trailing end (44), a non-working major face (46), and a working major face (48), the leading end (42), trailing end (44), non-working major face (46), and working major face (48) at least partially defining an inspection zone (50) therebetween;

(ii) the one or more magnetic detectors (80) carried by the flexible, generally arcuate body (40) in the inspection zone (50); and (iii) one or more pressure actuators (52) removably attached to the non-working face (46) and configured to exert pressure on one or more regions (90) of the non-working major face (46) of the flexible, generally arcuate body (40) in the inspection zone (50) during an electromagnetic inspection of a tubular (2), forcing the flexible, generally arcuate body (40) to contort into a generally contoured shape as it passes over a contoured region (20) of the tubular (2).

In certain embodiments the frame (102) may comprise a steel welded sub-frame supporting one or more pinch roller systems (130), the coil annulus (108) may comprise rigid aluminum, and the apparatus may be configured to perform a quality EMI of OCTG pipe with wall thicknesses up to about 0.625 inch (about 15.9 millimeters), and with production speeds up to about 150 feet per minute (about 46 meters per minute). In certain embodiments the EMI apparatus may be configured to operate continuously. In certain embodiments the EMI apparatus may be configured to inspect plain-end OCTG materials having an outer diameter ranging from about 2⅜ inches (about 60.3 mm) to about 8.00 inches (about 203.2 mm), or ranging from about 4½ inches (114.3 mm) to about 14.00 inches (355.6 mm). In certain embodiments the EMI apparatus may be configured to perform EMI methods including magnetic flux leakage technology for OD and ID longitudinal and transverse flaws, magnetic flux density for 100% coverage of the wall thickness variations, and an eddy current system for comparison of metallurgical mass and permeability differences.

Another aspect of the disclosure is a method of electromagnetically inspecting tubular members comprising passing a tubular member through an apparatus of the present disclosure or driving an apparatus of the present disclosure past the tubular member and detecting variations in the magnetic field produced by defects in the tubular member. In certain embodiments the variations in the magnetic field may be detected by the magnetic detectors spaced so that their respective magnetic fields abut and provide a minimum of 100 percent inspection of the tubular member.

In certain embodiments the tubular member, OCTG or other tubular, may be hollow; in other embodiments the tubular member may be solid. In certain embodiments the EMI apparatus frame may comprises a steel welded sub-frame supporting one or more pinch roller systems, and the coil annulus may comprise rigid aluminum.

In certain embodiments the EMI shoes may be configured to provide a set off distance for the magnetic detectors of at least 0.030 inch (about 0.08 mm); in certain other embodiments the set off distance may range from about 0.050 inch (about 1.27 mm) up to about 0.5 inch (about 12.7 mm). In certain embodiments the detector assembly may comprises a plurality of detector support sub-assemblies. Certain embodiments may comprise one or more actuators selected from the group consisting of pneumatic, hydraulic, and electronic actuators, and combination thereof, for example, to actuate the one or more pressure actuators, and in certain embodiments, telescoping members, to actuate an iris, and the like.

In certain embodiments various components (for example, but not limited to the magnetic flux generator, detectors, telescoping supports, and/or iris (as disclosed in assignee's co-pending U.S. patent application Ser. No. 16/987,211, filed Aug. 6, 2020)) may be operated remotely via wired or wireless communication, and/or locally via on-board batteries, an on-board motor, and one or more programmable logic controllers (PLCs). Certain embodiments may comprise a software module including one or more algorithms for calculating or presenting parameters selected from the group consisting of longest substantially longitudinal flaw, deepest substantially longitudinal flaw, longest substantially transverse flaw, deepest substantially transverse flaw, minimum and maximum wall thickness, and combinations thereof. In certain embodiments the detector assembly may comprise one or more electromagnetic acoustic transducer (EMAT) sensors.

Certain embodiments may further comprise a tubular conveyor sub-system on which the tubulars traverse before and after being inspected. Certain embodiments may further comprise one or more actuators (in certain embodiments, one or more robots) adapted to pick up the tubular being inspected and insert the tubular into an EMI apparatus as disclosed in accordance with the present disclosure, the one or more actuators selected from the group consisting of pneumatic, hydraulic, and electronic actuators, and combination thereof.

These and other features of the apparatus, systems, and methods of the disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain apparatus, systems, and methods in accordance with the present disclosure may comprise a number of physical or chemical components and features but may be devoid of certain optional physical, chemical or other components and features.

BRIEF DESCRIPTION OF THE DRAWINGS

The manner in which the objectives of this disclosure and other desirable characteristics can be obtained is explained in the following description and attached drawings in which:

FIG. 1 is a schematic sectional view of a tubular being inspected by an ultrasonic inspection probe of the prior art;

FIGS. 2A, 2B, 2C, and 2D are schematic sectional views of the same tubular as in FIG. 1 being inspected by one embodiment of an EMI shoe of the present disclosure;

FIG. 6 is a logic diagram of one method of inspecting pipe or other OCTG in accordance with the present disclosure.

It is to be noted, however, that the appended drawings of FIGS. 2A-D, 3, 4, and 5 may not be to scale and illustrate only typical apparatus and system embodiments of this disclosure. Furthermore, FIG. 6 illustrates only one of many possible methods of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

Figure 3:
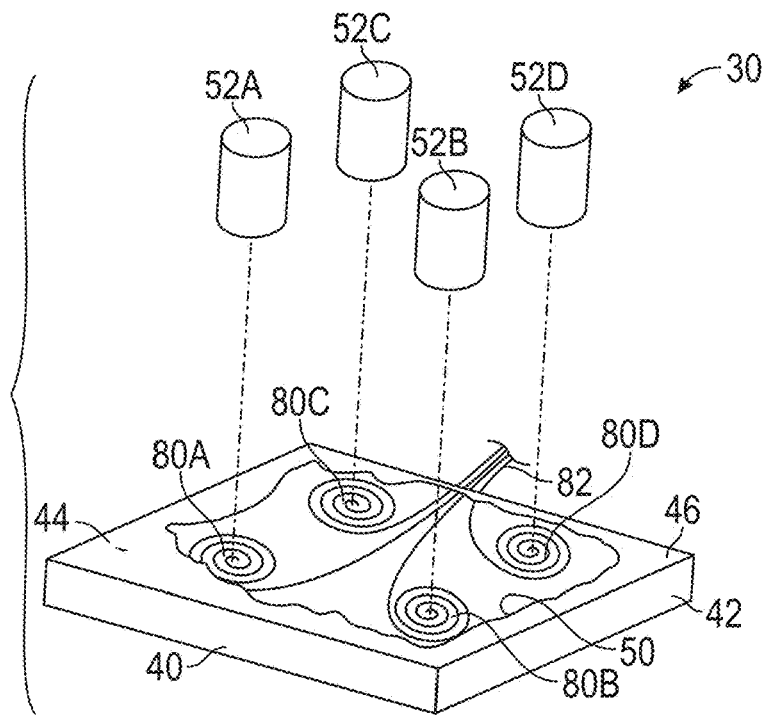
FIG. 3 is a schematic exploded view, with some portions cut away, of the EMI shoe embodiment illustrated in FIGS. 2A, 2B, 2C, and 2D.

In the following description, numerous details are set forth to provide an understanding of the disclosed apparatus, systems, and methods. However, it will be understood by those skilled in the art that the apparatus, systems, and methods disclosed herein may be practiced without these details and that numerous variations or modifications from the described embodiments may be possible. All U.S. patent applications and U.S. patents referenced herein are hereby explicitly incorporated herein by reference, irrespective of the page, paragraph, or section in which they are referenced. Where a range of values describes a parameter, all subranges, point values and endpoints within that range are explicitly disclosed herein. Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The present disclosure describes apparatus, systems, and methods for inspection of OCTG or other tubular or pipe. As mentioned herein, OCTG means any tubular used in the oil & gas industry, including solid tubulars such as rod pump rods, including but not limited to, drill pipe, line pipe, casing, coiled tubing, and the like, including those that have been through none, all or a combination of any one or more of the common mechanical, thermal, chemical OCTG treatment methods.

The apparatus may comprise a single or multiple detectors (sometimes referred to herein as "detector elements", "instruments", or simply "detectors") using magnetic flux leakage principles, eddy current, electromagnetic acoustic (EMA), or any combinations of these, to inspect OCTG for the presence of flaws. The detector(s) may be mounted on the apparatus through a variety of ways depending on the detector being installed, positions available in the apparatus, and the accuracy of flaw detection required. Software either intrinsic to the detector, or installed elsewhere in the apparatus, or installed remotely on a computer type device, converts the measurements into usable calculated information. The usable calculated information may be displayed locally at the device and/or remotely on a computer type device. Digital signal processing software, known under the trade designation Digi-Pro™, available from Scan Systems Corp, Houston, Tex., allows 100 percent of the inspection signal to be digitized and processed within a computer. The computer and digital signal processing software known under the trade designation Digi-Pro™ may utilize a series of virtual printed circuit boards known under the trade designation SimKardz™ to perform the calculations required. Signals may be captured from the detectors and digitized almost immediately, then processed through one or more algorithms to produce large signal to noise ratios. Improvements in signal to noise ratios of at least 20 percent, sometimes at least 100 percent, and in certain embodiments even 200 percent have been seen, compared with existing industry standard equipment. Hall Element devices may be used to sense the electrical shift in voltage during the inspection methods of the invention; however, there could be any number of different sensing technologies that could be used, eddy current being one of the other preferred sensing technologies.

In certain embodiments, the magnetic field fluctuation detectors may be hall units. Other similar devices may be utilized with the method, selected from magneto resistors, magneto diodes, and combinations of hall units, magneto resistors, and magneto diodes. As noted in U.S. Pat. No. 7,038,445, the number of flux lines flowing through the hall detector will be a function of the wall thickness of the material being monitored. Therefore, this monitoring device of the hall units spaced within the inside circumference of a magnetic coil provides the means of measuring the wall thickness of the pipe or OCTG. In certain embodiments, an "or" circuit may be interconnected with each group of magnetic fluctuation detectors so that the largest signal generated from a group of hall units may be determined. In certain embodiments, a defect monitor may be interconnected with each group of the magnetic fluctuation detectors to identify defective hall units.

The term "pipe," as used herein, includes any pipe, hose, tube, pole, shaft, cylinder, duct, rod, oil field tubular, tubing for the flow of oil or gas, casing, drill pipe, oil field tubulars and equivalents thereof made in whole or part of a ferromagnetic material. The term "flaw" as used herein includes any defects, discontinuities or irregularities in the walls or on the surface of the pipe, for example, seams, cracks, chips, and unusual wear.

The terms "magnetic field fluctuation detector" and "magnetic flux detector" used herein, includes hall units, magneto diodes and magneto resistors. In certain embodiments the magnetic fluctuation detector utilized with apparatus, systems, and method embodiments described herein is a hall unit. The term "hall unit," as used herein, includes any Hall detector, and any device or detector which produces a voltage in relation to a magnetic field applied to the detector. Although well known, a brief description of the hall detector is provided. A Hall detector is generally manufactured as a four terminal solid state device which produces an output voltage proportional to the product of an input current, a magnetic flux density and the sine of the angle between magnetic flux density and the plane of the hall detector. A Hall detector typically has an active element and two pairs of ohmic contacts. An electric current flows between two contacts aligned in one direction x. This current, the magnitude and direction of which are known from a calibration stage, in the presence of a perpendicular magnetic field, generates a respective Hall voltage in the other two contacts aligned in a transverse direction y. As known, a Hall detector is sensitive to that component of the magnetic field which is perpendicular to its surface. More specifically, the Hall voltage is responsive to the current flow and to the strength of a magnetic field provided within the vicinity of the Hall detector.

The terms "magnetic field generator" and "magnetic coil" as used herein, include any device capable of generating a horizontal, vertical, or other directional magnetic field of flux. Preferably the magnetic field generator is a coil such an encircling coil or circular coil with multi-turns of wire located in the cavities of the coil. The term "coil annulus" means a structure holding, supporting, and/or encompassing a magnetic field generator or magnetic coil.

Eddy current inspection, as explained in U.S. Pat. No. 5,142,230, is a non-destructive procedure used to detect flaws and stress corrosion in electrically conductive materials. This method involves placing an eddy current probe, comprising a coil, near the electrically conductive material.

The coil sets up a magnetic field and induces eddy currents in the material. Defects in the material alter the eddy current flow and change the impedance of the coil. As a result, flaws and stress corrosion may be detected by moving the eddy current probe along the material and detecting changes of impedance of the coil.

In certain embodiments, one or more substantially frictionless members may be employed in the detector shoes (or the structure supporting the inspection shoes) to maintain the first or "standoff" distance, as discussed in U.S. Pat. Nos. 7,397,238 and 7,622,917. In certain embodiments the one or more substantially frictionless members may comprises one or more members selected from precision metal rollers, metal ball bearings, plastic rollers, ceramic balls, and non-rotating spacers in ball or roller shape. In certain embodiments, the inspection shoe supports may be actuated by a dual linkage actuator disclosed in the '238 and '917 patents and selected from pneumatic, hydraulic, and electronic actuators. In certain embodiments, telescoping supports and iris rotatable elements such as disclosed in assignee's co-pending U.S. patent application Ser. No. 16/987,211, filed Aug. 6, 2020, may be actuated by an actuator selected from pneumatic, hydraulic, and electronic actuators. In certain embodiments the detector assemblies may each support a transverse magnetic detector and a wall thickness detector. The detectors may be selected from Hall elements, magneto diodes, and magneto resistors. In certain embodiments, the variations in the magnetic field detected by magnetic flux detectors and the variations in eddy current detected by eddy current detectors are provided by spacing the detectors so that their respective magnetic or electric fields abut and provide a minimum of 100 percent inspection of the tubular member.

The primary features of the apparatus, systems, and methods of the present disclosure will now be described with reference to the drawing figures, after which some of the construction and operational details, some of which are optional, will be further explained. The same reference numerals are used throughout to denote the same items in the figures.

Before describing embodiments of the present disclosure, FIG. 1 is a schematic sectional view of a tubular 2 being inspected by an ultrasonic inspection probe of the prior art comprising a pair of sled appendages 4 (only one being illustrated in FIG. 1) supporting inspection probe body 6, including a plate 8 supporting one or more ultrasonic inspection detectors 10. A connecting bracket 12 connects inspection probe body 6 to a probe extension coupler 14 that serves to move the probe perpendicular to the object being inspected. A dual action cylinder, represented by a pressure gauge 16 having low-pressure and high-pressure limits 17, 18, and a pressure indicator arrow, is connected to probe extension coupler 14. Details are explained in U.S. Pat. No. 7,640,811, such a probe being used to inspect aircraft fuselages, among other objects. Such probes are able to adjust for large contour changes, for example, when the probe encounters an aircraft window or door. However, as indicated schematically in FIG. 1, they are not capable of compensating for contours 20 in a tubular, such as OCTG or similar tubulars, and therefore incapable of detecting flaws located within those contours, such as a crack 22. The sleds of such probe, being rigid, will largely bridge such contours. Since during magnetic flux leakage testing, disturbances in the magnetic flux lines are weaker further away from the flaw, a magnetic flux detector employing such a probe will most likely fail to detect crack 22 in contour 20. The same may be said for rigid inspection shoes currently in use for detecting disturbances in magnetic flux due to a flaw. A "rigid" inspection shoe riding over such a contour 20 will result in the magnetic flux detectors being too far away from the flaw, resulting in a "cut-out" of the signal from such detectors.

In contrast, the EMI inspection shoes of the present disclosure, one embodiment 30 illustrated schematically in FIGS. 2A, 2B, 2C, and 2D are designed to overcome this limitation of rigid EMI shoes. EMI shoe 30 includes a flexible, substantially arcuate body 40 having a leading end 42, a trailing end 44, a non-working major face 46, and a working major face 48, at least partially defining an inspection zone 50 (see FIG. 3). Pressure actuators 32, as further explained herein, function to maintain a downward pressure on flexible, substantially arcuate body 40, as indicated by arrows 34, 36, so that when for example the leading end 42 of body 40 enters contour 2 of tubular 2, body 40 will be gently forced into the contour, as indicated in FIG. 2A and contorting body 40 to take a generally contoured shape, in the case of FIGS. 2A and 2B a generally concave upwards shape. As will be recognized, this also substantially maintains the set-off distance of detectors 10. As the EMI continues, the flexible body 40 contorts into a generally convex shape as the leading end 42 passes out of contour 20 and trailing end 44 passes through contour 20, as illustrated schematically in FIG. 2C, and further contorts back into its substantially arcuate shape as illustrated schematically in FIG. 2D.

FIG. 3 is a schematic exploded view, with some portions cut away, of the EMI shoe embodiment 30 illustrated in FIGS. 2A, 2B, 2C, and 2D, illustrating four magnetic flux detector coils 80A, 80b, 80C, and 80D embedded within flexible, substantially arcuate body 40 within the inspection zone 50. While four magnetic flux detectors are illustrated, EMI detector shoes of this disclosure may have less than or more than this amount. As stated elsewhere herein, the magnetic flux detector coils may be replaced by hall units, magneto diodes, or other magnetic flux detectors, or a combination of these. Each magnetic flux detector coil 80A, 80B, 80C, and 80D has a signal lead wire 82 that connects in known fashion to signal processing hardware and software. Embodiment 30 also includes four pressure actuators 52A, 52B, 52C, and 52D, examples of which will be explained herein, each placed generally over a corresponding magnetic flux detector coil on non-working major face 46 of body 40. They made be attached by molding in, use of an adhesive, or other fasteners. Certain embodiments may include a socket for screwing in the pressure actuator.

Figure 4:
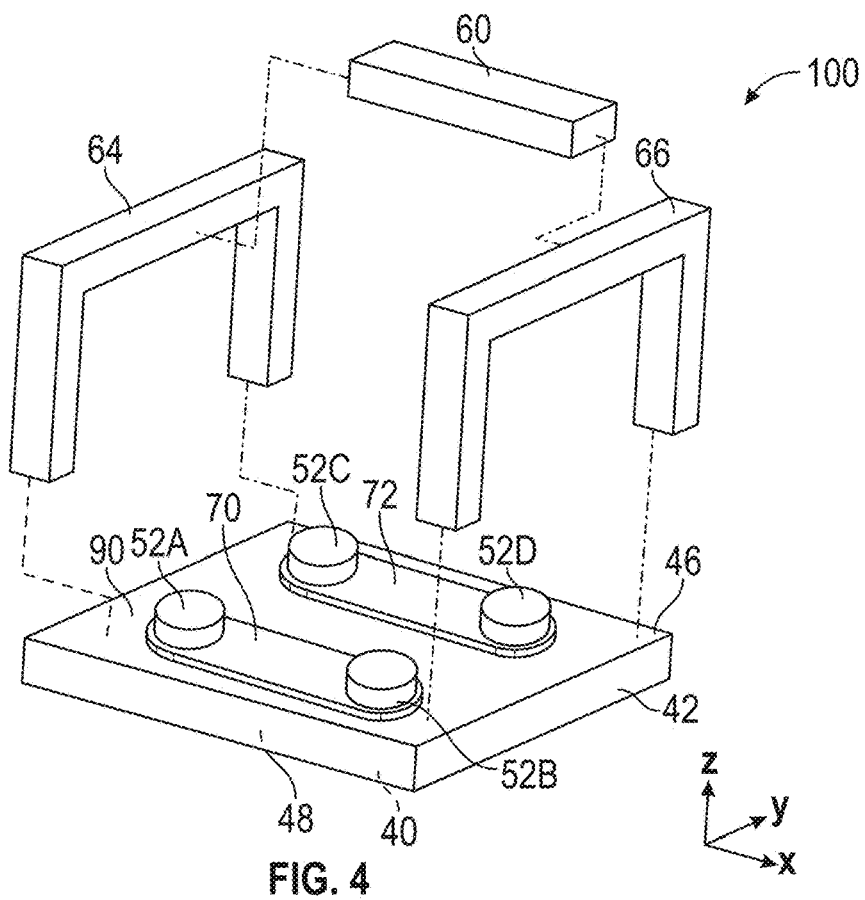
FIG. 4 is a schematic partially exploded view of another EMI shoe embodiment in accordance with the present invention.

FIG. 4 is a schematic partially exploded view of another EMI shoe embodiment 100 in accordance with the present invention, which is similar to embodiment 30 illustrated in FIG. 3 except embodiment 100 includes a pair of pressure plates 70, 72 upon which the pressure actuators 52 act. Pressure plates 70, 72 as illustrated in FIG. 4, embodiment 100, are illustrated as each supporting two pressure actuators in the X-direction, but this may not be the same in all embodiments. For example, pressure plate 70 may be arranged to support pressure actuators 52A and 52C, and pressure plate 72 may be arranged to support pressure actuators 52B and 52D. In other embodiments, each pressure actuator 52 may have its own pressure plate. In any case, pressure plates 70, 72 arranged as illustrated in FIG. 4 may serve a dual purpose of balancing the pressure applied to body 40 and providing an attachment socket or other support to the pressure actuators. Also illustrated in FIG. 4 in exploded portions are trailing end and lead end brackets 64, 66 as well as a connecting bracket 60, which may be employed in certain embodiments to attach the EMI shoe to an inspection apparatus (not shown). Brackets 64, 66 may attach to body 40 in numerous ways, such as by molding, clamping, threaded connections, flanged connections, and the like. Other embodiments may employ inspection shoe supports such as described and illustrated in U.S. Pat. Nos. 7,397,238 and 7,622,917. Brackets 60, 64, and 66 may also be used to support air, hydraulic, or other control fluids, operate pressure actuators 52, and/or or heat transfer fluids to cool components of EMI shoes. Although brackets 60, 64, and 66 are illustrated as separate components, this may or may not be so in all embodiments.

Figure 5:
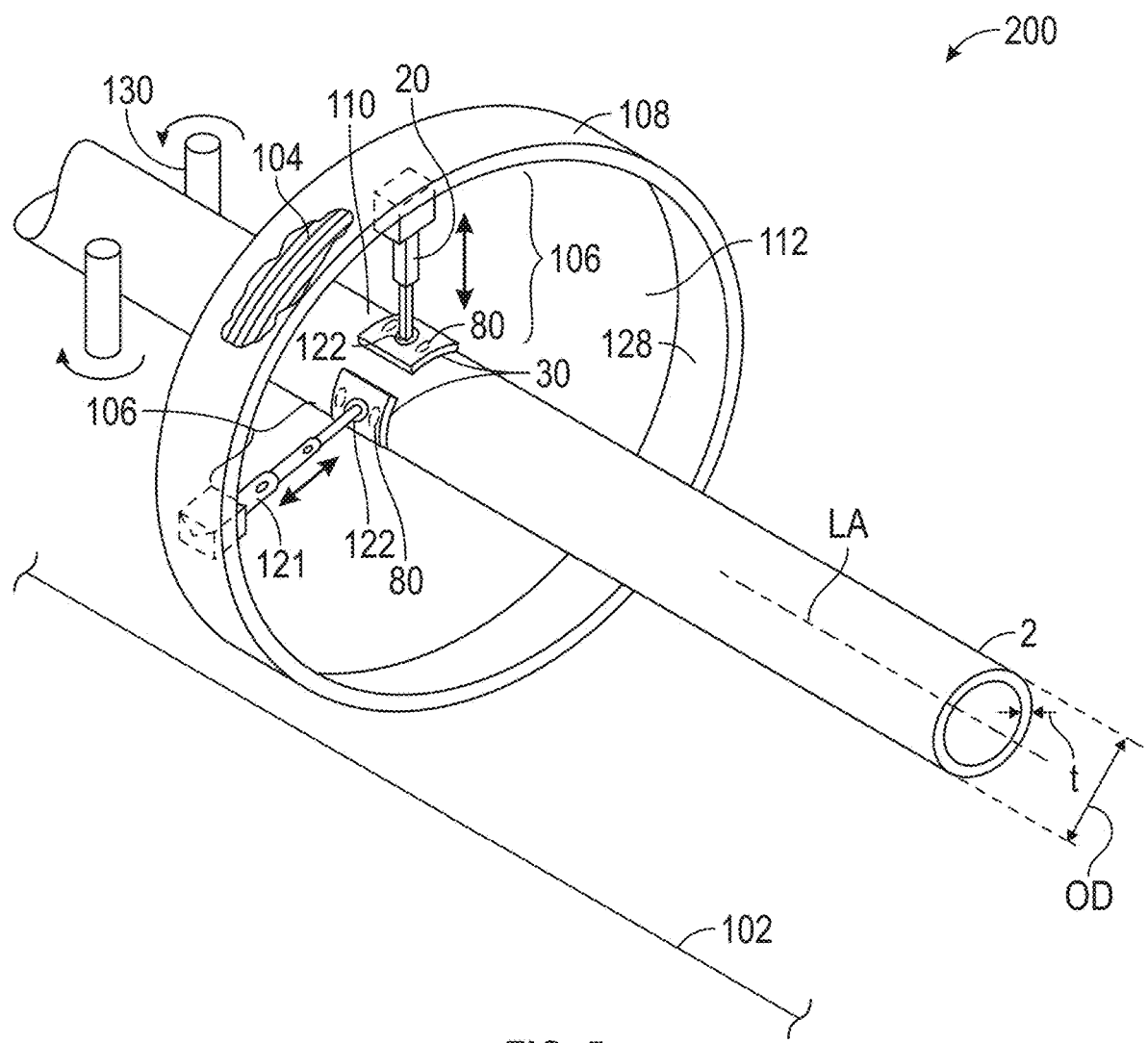
FIG. 5 is a schematic perspective illustration view, with some portions cut away, of a system in accordance with the present disclosure.

FIG. 5 is a schematic perspective illustration view, with some portions cut away, of an EMI system embodiment 200 in accordance with the present disclosure. Embodiment may comprise a frame 102, a magnetic flux generator (coil) 104 in a coil annulus 108, and a detector assembly 106 supported by frame 102. Coil annulus 108 and detector assembly 106 each have an inlet opening 110 and an outlet opening 112 for accepting a tubular member 2 therein for EMI thereof. Detector assembly 106 includes one or more magnetic flux or eddy current detectors 80 encapsulated in EMI detector shoes 30, the lower surface thereof adapted to be spaced a first distance from the outer surface of tubular member 2. Optionally, detector shoes 30 may be supported by, and spaced the first distance from the outer surface of tubular 2 by supports including one or more substantially frictionless members during an inspection, as taught in assignee's U.S. Pat. No. 7,397,238.

Still referring to FIG. 5, embodiment 200 further comprises detector shoe supports 120, 121, which in this particular embodiment are telescoping supports, each of which is attached to an inner surface 128 of coil annulus 108 such as by welding, brazing, bolting, or other attachment method or mechanism, or formed integrally with coil annulus 108. Detector shoe support 120 has a rectangular cross-section, while detector shoe support 121 has a circular cross-section. The cross-sectional shape may be the same or different for each detector shoe support, and they may have other cross-sectional shapes, such as triangular, oval, and the like. Adjustable telescoping tubes typically include spring button locking pins or single end snap buttons, and may be easily found on the Internet, such as at the website of W. W. Grainger, Inc. Other versions of telescoping supports may lock and unlock by a simple twist action. As indicated by the double-headed arrows in FIG. 5 proximate to telescoping detector shoe supports 120, 121, telescoping detector shoe supports 120, 121 allow detector shoes 30 to be moved inward and outward as desired, conveniently allowing EMI of different OD tubulars 2. In certain embodiments, tubular wall thickness (t) may also be investigated. A further feature of embodiment 200 is provision of quick-acting (Q-A) couplings 122, explained more fully in assignee's co-pending U.S. patent application Ser. No. 16/987,211, filed Aug. 6, 2020, that allow detector shoes 30 to be removably installed and removed quickly. For example, one or more detector shoes 30 for a 4-inch OD pipe may be used to inspect one or more of such tubulars, then the process stopped momentarily, for example by stopping a set of pinch rollers 130. While the process is stopped, the first set of detector shoes are removed and another set of detector shoes are installed to inspect larger or smaller tubulars.

In embodiment 200, as in other embodiment described herein, magnetic flux generator 104 is typically a coil of wire, but this is not strictly necessary, as any magnetic flux generator may be used, such as one or more permanent magnets. A combination of one or more coils and one or more permanent magnets may also be employed, although that may add unneeded complexity. Coil 104 is positioned within coil annulus 108. Coil annulus 108 is defined by a generally cylindrical outer wall of diameter d1 and a concentric generally cylindrical inner wall of diameter d2, wherein d1>d2. Generally cylindrical outer wall and generally cylindrical inner wall are each generally parallel to a tubular longitudinal axis (LA). Coil annulus 108 is further defined by front and back end plates connecting the generally cylindrical outer wall and the generally cylindrical inner wall at their peripheral edges.

Other system embodiments may include non-telescoping detector shoe supports, which may have a rectangular, circular, or other cross-sectional shape. Certain system embodiments may include provision of quick-acting (Q-A) couplings 122 that allow detector shoes 30 to be removably installed and removed, as well as a second set of Q-A couplings for removably installing and changing to different length non-telescoping detector shoe supports. Yet other system embodiments may have an iris mechanism, explained more fully in assignee's co-pending U.S. patent application Ser. No. 16/987,211, filed Aug. 6, 2020, where the iris comprises a number of leaves with brackets allowing addition of detector shoes 30 to the iris leaves. In certain embodiments, detector shoes 30 may attach directly to the iris leaves, such as by molding them integrally with the leaves, or by interference fittings. The leaves are so shaped that movement of the leaves results in the iris aperture closing, and the detector shoes moving toward the tubular being inspected. The aperture, and thus detector shoes, may be opened, or placed in any desired position, by the positioning of a handle. In alternative embodiment the handle may be connected to an operating actuator, for example an electric motor, which may be electronically controlled. The iris mechanism as described may also be used in a dual plane iris of the known type, which may allow addition detector shoes and/or sensors to be utilized.

Systems in accordance with the present disclosure may further comprises a tubular conveyor sub-system, as more fully described in assignee's copending U.S. Pat. No. 11,307,173, on which a plurality of tubular members P1, P2, P3 . . . PN may traverse before and after being inspected at one of the inspection apparatus of the present disclosure. Such systems may comprise one or more actuators adapted to pick up a tubular member being inspected (employing manipulators arms and pipe grippers) and insert tubular member into an inspection apparatus, the one or more actuators selected from the group consisting of pneumatic, hydraulic, and electronic actuators, and combination thereof. In certain embodiments actuator or actuators may be robotic actuators, such as the IRB 7600 industrial robot, available from ABB Asea Brown Boveri Ltd. Simple cranes or other pipe lifting equipment known in the OCTG inspection industry may also be employed. Actuators may be floor mounted, cabinet-mounted, or roof-mounted. In certain embodiments the actuator(s) should have capacity to lift standard lengths of steel pipe.

As noted herein, certain system embodiments may include one or more quick-acting couplings selected from the group consisting of ball-lock couplings, roller-lock couplings, pin-lock couplings, flat-faced couplings, bayonet couplings, ring-lock couplings, cam-lock couplings, multi-tube connectors, and combinations thereof. These features are further described in assignee's co-pending U.S. patent application Ser. No. 16/987,211, filed Aug. 6, 2020. The choice of a particular material for the Q-A couplings is dictated among other parameters by the vibration and degree of expected twisting motion of the inspection shoes expected during use of EMI apparatus, temperature, an expected humidity and other environmental conditions.

Flexible materials suitable for use in the EMI shoes of the present disclosure are many, but a few examples are provided here. The flexible materials described in U.S. Pat. No. 4,465,829 comprise the addition of selected amounts of particular low molecular weight polyisobutylene to natural rubber containing compositions, which reduces heat buildup normally incident to dynamic conditions. In other words, such addition reduces hysteresis, i.e. reduces the amount of energy dissipated as heat when the rubber is subjected to a stress strain cycle. The compositions allow the inclusion of preferred amounts of reinforcing filler and the use of normal cross-linking conditions without deleterious effect on tear strength, and also reduces compression set in the cured compositions, without unduly affecting modulus, tensile and elongation properties. The compositions are elastomeric compositions for use under dynamic, high heat (e.g. up to 300° F.) conditions and comprise (a) 100 parts by weight of elastomer selected from the group consisting of natural rubber and blends of natural rubber with up to about 50% by weight synthetic rubber, (b) from 5 to about 15 parts by weight of polyisobutylene having a number average molecular weight ranging from about 800 to about 2,000, and (c) from about 30 to about 75 parts by weight of reinforcing filler. The aforementioned ingredients are utilized in combination with a curing system to provide a cured composition with the aforementioned very desirable attributes. The aforementioned ingredients (a), (b), and (c) are normally kept apart from at least part of the curing system until just prior to curing. The number average molecular weights referred to herein are those determined by vapor pressure osmometry. As used in the '829 patent, the term "phr" means parts by weight per 100 parts by weight of elastomer. Tests conducted on these materials (according to the patent) revealed the flexible materials have a compression set of 20.8, and 300% modulus between 1870 psi and 2010 psi (12.5 to 13.4 MPa).

The flexible materials described in U.S. Pat. No. 4,585,826 comprise inclusion of selected amounts of particular liquid carboxy-terminated unsaturated butadiene-acrylonitrile copolymers (sometimes referred to hereinafter as CTBN) to natural rubbers. The compositions have increased the tear strength compare with natural rubber containing compositions. The compositions allow the inclusion of preferred amounts of reinforcing filler and the use of normal cross-linking conditions without deleterious effect on tear strength and instead is characterized by increased tear strength compared to a natural rubber composition without the CTBN additive, and allows the flexibility of including synthetic rubber in place of some of the natural rubber while maintaining the high tear strength normally associated with natural rubber compositions. The inclusion of the selected amounts of the CTBN increases the hardness of cured compositions and reduces the viscosity (thus aiding processing) of uncured compositions. The compositions are elastomeric compositions which are curable and comprise (a) 100 parts by weight polymer consisting of (i) from about 95 to about 25 parts by weight of natural rubber, (ii) from 0 to about 65 parts by weight of synthetic rubber, (iii) from about 5 to about 25 parts by weight of liquid carboxy-terminated butadiene-acrylonitrile copolymer having a functionality ranging from about 1.5 to about 2.5, an acrylonitrile content ranging from about 10% to about 40% by weight and a Brookfield viscosity at 27° C. ranging from about 50,000 to about 200,000 centipoise, and (b) from about 30 to about 120 parts by weight of reinforcing filler. The aforementioned ingredients are used with a conventional curing system to provide a cured composition which exhibits the aforementioned very desirable attributes. In certain embodiments, the aforementioned ingredients (a) and (b) can be kept apart from at least part of the curing system until just prior to curing. As used in the '826 patent, the term "phr" refers to parts by weight per hundred parts by weight of polymer consisting of natural rubber, any synthetic rubber present and the CTBN. Tests conducted on these materials (according to the patent) revealed the flexible materials have a compression set of 33, and 300% modulus of 1889 psi (12.6 MPa).

The flexible materials described in the '826 and '829 patents may be enhanced by the addition of nanometric filamentary structures, such carbon nanotubes and other such additives, as defined and described in U.S. Pat. No. 9,879,131. Tests conducted on these materials (according to the patent) revealed the flexible materials have a 100% modulus ranging from 679 to 892 psi, a 300% modulus ranging from 1142 to 2634 psi (MPa), and an abrasion resistance (ASTM D-5963-04(2015) ranging from 62 to 133.

Suitable pressure actuators 52 for use in the apparatus, systems, and methods of the present disclosure include industrial springs of many types, including coil springs, washer springs (or spring washers, or belleville spring washers), and differential pressure actuators. In certain embodiments the pressure actuators may have be able to exert a force sufficient to force the flexible material into a concave contour, where the concave contour has a maximum depth of about 0.1 inch (about 2.5 mm), or about 0.2 inch (about 5 mm), or about 0.3 inch (about 7.5 mm), or about 0.4 inch (about 10 mm), or about 0.5 inch (12.5 mm). The force sufficient to force the flexible material into a concave contour may be several pounds (Newtons) of force, up to about 20 pounds of force (about 90 N), or from about 2 (about 9 N) to about 15 (about 68 N), or from about 3 (about 14 N) to about 10 pounds (about 45 N) of force, depending on the physical properties of the flexible material. In the case of belleville springs, one or more belleville springs, or their many variations, of the same or different spring force may be used in any given pressure actuator, including stacked belleville springs (series stacks, parallel stacks, and series-parallel stacks). Belleville springs, and variations of classic belleville springs including slotted disc springs, contact disc springs, finger spring washers, wave spring washers, and the like, are commercially available from MW Industries, Inc., Rosemont, Illinois, (USA). Belleville washers or belleville springs are available in many materials, including steel, plastic, and elastomeric materials. Selection may be made using the Precision Spring Catalog (2014), published and available online from the same company. The spring or belleville spring(s) may be enclosed in a cylinder as illustrated in FIGS. 2-4, or other structure.

In certain embodiments the differential pressure actuator may comprise a closed conduit arranged in a curvilinear structure, such as disclosed in U.S. Pat. No. 9,097,081. By applying a differential pressure to the closed conduit, the curvature of the curvilinear structure is changed. This change can be used to actuate a corresponding tool between desired operational positions. As the pressure inside the closed conduit increases relative to the pressure acting on the exterior of the closed conduit, the curves of the closed conduit tend to straighten. This tendency to straighten is useful for applying an actuation force. For example, the closed conduit can be used to drive a movable member coupled to a tool which is actuated between operational positions. By way of example, the closed conduit may be constructed from a metal material, such as a steel material. In some environments, the closed conduit may be constructed from stainless steel to limit corrosion. However, the closed conduit may be made from a variety of other metals and other types of materials depending on the parameters of a given environment and application.

The skilled artisan, having knowledge of the particular application, environmental conditions, and available materials, will be able design the most cost effective, safe, and operable EMI inspection shoes and systems for each particular application without undue experimentation.

FIG. 6 is a logic diagram of one method embodiment 150 of EMI inspecting pipe or other OCTG in accordance with the present disclosure. Method embodiment 150 comprises passing a tubular member through an EMI apparatus, or driving the EMI apparatus past the tubular member, and detecting variations in the magnetic field produced by defects in the tubular member, wherein the EMI apparatus comprises (box 152):

(a) a frame (102);
  (b) at least one magnetic flux generator (104) contained in a coil annulus (108) and a detector assembly (106) supported by the coil annulus (108);
  (c) the coil annulus (108) and the detector assembly (106) each having inlet and outlet openings (110, 112) for passing a tubular member (2) there through, the detector assembly (106) having one or more magnetic detectors (80) (magnetic flux, eddy current, or both) configured to be spaced a first distance from the tubular member (2) during an inspection (box 154); and
  (d) the one or more magnetic detectors (80) each contained in one or more EMI detector shoes (30), at least one of the one or more EMI detector shoes comprising:
    (i) a flexible, generally planar body (40) comprising a flexible material, the flexible, generally planar body (40) having a leading end (42), a trailing end (44), a non-working major face (46), and a working major face (48), the leading end (42), trailing end (44), non-working major face (46), and working major face (48) at least partially defining an inspection zone (50) therebetween;
    (ii) one or more magnetic flux detectors (80) carried by the flexible, generally planar body (40) in the inspection zone (50); and
    (iii) one or more pressure actuators (52) removably attached to the non-working face (46) and configured to exert pressure on one or more regions (90) of the non-working major face (46) of the flexible, generally planar body (40) in the inspection zone (50) during an EMI inspection of a tubular (2), forcing the flexible, generally planar body (40) to contort into a non-generally planar shape as it passes over a contoured region (20) of the tubular (2) (box 156).

An on-board power unit may be included in certain system embodiments for powering the magnetic flux generator(s), which may be a permanent or rechargeable battery pack or transformer for electrical power, or both. An on-board electronics package may include one or more microprocessors, a communications link (wired or wireless), and/or an on-board controller. A CRT, LED or other human-machine interface may be included on or in a workstation cabinet in certain embodiments.

Magnetic flux generator(s) 104, detector shoes 30, and pinch rollers 130 may, in certain embodiments, be powered from within via an instrument display or other human/machine interface (HMI), for example using batteries, Li-ion or other type. In other embodiments display/HMI may be powered from an instrument cable providing power, perhaps by a local generator, or grid power. The display/HMI allows an operator to interface with the instrument. In certain embodiments the operator will be able to take measurements, view or read these measurements and reset the instrument for subsequent measurement taking. If the display/HMI is connected to a power cable, then measurements may be taken remotely, stored and reset as necessary.

In certain embodiments power would be supplied at a voltage and current that enables the systems to be intrinsically safe. By "intrinsically safe" is meant the definition of intrinsic safety used in the relevant IEC apparatus standard IEC 60079-11, defined as a type of protection based on the restriction of electrical energy within apparatus and of interconnecting wiring exposed to the potentially explosive atmosphere to a length below that which can cause ignition by either sparking or heating effects. For more discussion, see "AN9003—A User's Guide to Intrinsic Safety", retrieved from the Internet Jul. 12, 2017, and incorporated herein by reference.

What has not been recognized or realized are apparatus, systems, and methods to inspect OCTG, especially with a combination of magnetic flux detectors and eddy current detectors, or only with magnetic flux detectors, for tubulars having contoured OD. Apparatus, systems, and methods to accomplish this quickly to increase pipe production without significant risk to workers is highly desirable.

In will be apparent that in other embodiments, the various components need not have the shapes illustrated in the various drawing figures, but rather could take any shape. For example, the coil annulus could have a box or cube shape, elliptical, triangular, pyramidal (for example, three or four sided), prism-shaped, hemispherical or semi-hemispherical-shaped (dome-shaped), or combination thereof and the like, as long as the apparatus is capable of generating the required magnetic flux to inspect the OCTG or other tubulars. Pressure actuators could be enclosed in structures other than cylindrical enclosures depicted in the various drawings. EMI shoes could have curvilinear shapes other than generally arcuate as illustrated. It will be understood that such embodiments are part of this disclosure and deemed with in the claims. Furthermore, one or more of the various components may be ornamented with various ornamentation produced in various ways (for example stamping or engraving, or raised features such as reflectors, reflective tape, and the like), oil tool designs, logos, letters, words, nicknames (for example BIG JAKE, and the like). Hand holds may be machined or formed to have easy-to-grasp features for fingers, or may have rubber grips shaped and adorned with ornamental features, such as raised knobby gripper patterns.

Thus the apparatus, systems, and methods described herein provide a quick and safe way of inspecting OCTG of contoured OD accurately and repeatably.

From the foregoing detailed description of specific embodiments, it should be apparent that patentable apparatus, systems, and methods have been described. Although specific embodiments of the disclosure have been described herein in some detail, this has been done solely for the purposes of describing various features and aspects of the apparatus, systems, and methods, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification of system embodiments would be to provide rotation of the inspection unit rather than, or along with, rotation of the OCTG or other tubular. Such embodiments are considered with the present disclosure.

What is claimed is:

1. An electromagnetic inspection (EMI) shoe (30) comprising:
    (a) a flexible, generally arcuate solid body (40) comprising a flexible material of uniform flexural strength, the flexible, generally arcuate solid body (40) devoid of a bore and having a leading end (42), a trailing end (44), a non-working major face (46), and a working major face (48), the leading end (42), trailing end (44), non-working major face (46), and working major face (48) at least partially defining an inspection zone (50) therebetween;
    (b) one or more magnetic detectors (80) carried by the flexible, generally arcuate solid body (40) in the inspection zone (50); and
    (c) one or more pressure actuators (32, 52) removably attached to the non-working major face (46) and configured to exert pressure on one or more regions (90) of the non-working major face (46) of the flexible, generally arcuate solid body (40) in the inspection zone (50) during an electromagnetic inspection of a tubular (2), forcing the flexible, generally arcuate solid body (40) to contort into a generally contoured shape as it passes over a contoured region (20) of the tubular (2).

2. The EMI shoe of claim 1 wherein the flexible material has a 300% modulus less than or equal to about 2100 psi (about 14 MPA) when tested in accordance with ASTM D412-2015 (Method A); or a 100% modulus less than or equal to about 1000 psi (about 7 MPa) when tested in accordance with ASTM D412-2015 (Method A); or a compression set (CB or $C_B$) less than or equal to about 50 when tested in accordance with ASTM D395-2018 (Method B).

3. The EMI shoe of claim 1 wherein the one or more pressure actuators (52) comprises one or more springs.

4. The EMI shoe of claim 1 wherein one or more of the one or more pressure actuators (52) comprises a differential pressure actuator.

5. The EMI shoe of claim 1 wherein the differential pressure actuator comprises a closed conduit arranged in a curvilinear structure.

6. The EMI shoe of claim 1 further comprising one or more pressure plates (70) interposed between the one or more pressure actuators and the non-working major face (46) of the flexible, generally arcuate solid body (40).

7. The EMI shoe of claim 6 wherein the one or more pressure plates (70) have a second flexural strength greater than the flexural strength of the flexible material of the flexible, generally arcuate solid body (40).

8. An electromagnetic inspection (EMI) shoe (30) comprising:
    (a) a flexible, generally arcuate solid body (40) comprising a flexible material of uniform flexural strength, the flexible, generally arcuate solid body (40) devoid of a bore and having a leading end (42), a trailing end (44), a non-working major face (46), and a working major face (48), the leading end (42), trailing end (44), non-working major face (46), and working major face (48) at least partially defining an inspection zone (50) therebetween;
    (b) one or more magnetic detectors (80) carried by the flexible, generally arcuate solid body (40) in the inspection zone (50); and
    (c) one or more pressure actuators (52) removably attached to the non-working major face (46) and configured to exert pressure on one or more regions (90) of the non-working major face (46) of the flexible, generally arcuate solid body (40) in the inspection zone (50) during an electromagnetic inspection of a tubular (2), forcing the flexible, generally arcuate solid body (40) to contort into a generally contoured shape as it passes over a contoured region (20) of the tubular (2), the flexible material having a 300% modulus less than or equal to about 2100 psi (about 14 MPa) when tested in accordance with ASTM D412-2015 (Method A); or a 100% modulus less than or equal to about 1000 psi (about 7 MPa) when tested in accordance with ASTM D412-2015 (Method A); or a compression set (CB or $C_B$) less than or equal to about 50 when tested in accordance with ASTM D395-2018 (Method B).

9. A tubular member electromagnetic inspection (EMI) apparatus comprising:
    (a) a frame (102);
    (b) at least one magnetic flux generator (104) contained in a coil annulus (108) and a detector assembly (106) supported by the coil annulus (108);
    (c) the coil annulus (108) and the detector assembly (106) each having inlet and outlet openings (110, 112) for passing a tubular member (2) there through, the detector assembly (106) having one or more magnetic detectors (80) configured to be spaced a first distance from the tubular member (2) during an inspection; and
    (d) the one or more magnetic detectors (80) each contained in one or more EMI detector shoes (30), at least one of the one or more EMI detector shoes comprising:
        (i) a flexible, generally arcuate solid body (40) comprising a flexible material of uniform flexural strength, the flexible, generally arcuate solid body (40) devoid of a bore and having a leading end (42), a trailing end (44), a non-working major face (46), and a working major face (48), the leading end (42), trailing end (44), non-working major face (46), and working major face (48) at least partially defining an inspection zone (50) therebetween;
        (ii) the one or more magnetic detectors (80) carried by the flexible, generally arcuate solid body (40) in the inspection zone (50); and
        (iii) one or more pressure actuators (52) removably attached to the non-working face (46) and configured to exert pressure on one or more regions (90) of the non-working major face (46) of the flexible, generally arcuate solid body (40) in the inspection zone (50) during an electromagnetic inspection of a tubular (2), forcing the flexible, generally arcuate solid body (40) to contort into a generally contoured shape as it passes over a contoured region (20) of the tubular (2).

10. The tubular member EMI apparatus of claim 9 wherein the flexible material has a 300% elongation ranging from about 2000 psi (about 14 MPa) to about 1000 psi (about 7 MPa) when tested in accordance with ASTM D412-2015 (Method A).

11. The tubular member EMI apparatus of claim 9 wherein the flexible material has a compression set less than about 50 when tested in accordance with ASTM D395-2018 (Method B).

12. The tubular member EMI apparatus of claim 9 wherein the one or more pressure actuators (52) comprises one or more springs.

13. The tubular member EMI apparatus of claim 9 wherein one or more of the one or more pressure actuators (52) comprises a differential pressure actuator.

14. The tubular member EMI apparatus of claim 13 wherein the differential pressure actuator comprises a closed conduit arranged in a curvilinear structure.

15. The tubular member EMI apparatus of claim 9 further comprising one or more pressure plates (70) interposed between the one or more pressure actuators and the non-working major face (46) of the flexible, generally arcuate solid body (40).

16. The tubular member EMI apparatus of claim 15 wherein the one or more pressure plates (70) have a second flexural strength greater than the flexural strength of the flexible material of the flexible, generally arcuate solid body (40).

17. The EMI apparatus of claim 9 wherein the frame (102) comprises a steel welded sub-frame supporting one or more pinch roller systems (130), the coil annulus (108) comprises rigid aluminum, and the apparatus is configured to perform a quality electromagnetic inspection of OCTG pipe with wall thicknesses up to about 0.625 inch (15.9 millimeters), and with production speeds up to about 150 feet per minute (about 46 meters per minute).

18. The EMI apparatus of claim 9 configured to operate continuously and configured to inspect plain-end OCTG materials having an outer diameter ranging from about 2⅜ inches (about 60.3 mm) to about 8.00 inches (about 203.2 mm), or ranging from about 4½ inches (114.3 mm) to about 14.00 inches (355.6 mm), the EMI apparatus configured to perform electromagnetic inspection methods including magnetic flux leakage technology for OD and ID longitudinal and transverse flaws, magnetic flux density for 100% coverage of the wall thickness variations, and an eddy current system for comparison of metallurgical mass and permeability differences.

19. A method of electromagnetically inspecting tubular members comprising passing a tubular member through the apparatus of claim 9 or driving the apparatus of claim 9 past the tubular member and detecting variations in the magnetic field produced by defects in the tubular member.

20. The method of claim 19 wherein the variations in the magnetic field are detected by the magnetic detectors spaced so that their respective magnetic fields abut and provide a minimum of 100 percent inspection of the tubular member.

* * * * *